B. C. F. PRITZEL.
PLOW RELEASING DEVICE.
APPLICATION FILED DEC. 4, 1920.
1,373,971.
Patented Apr. 5, 1921.
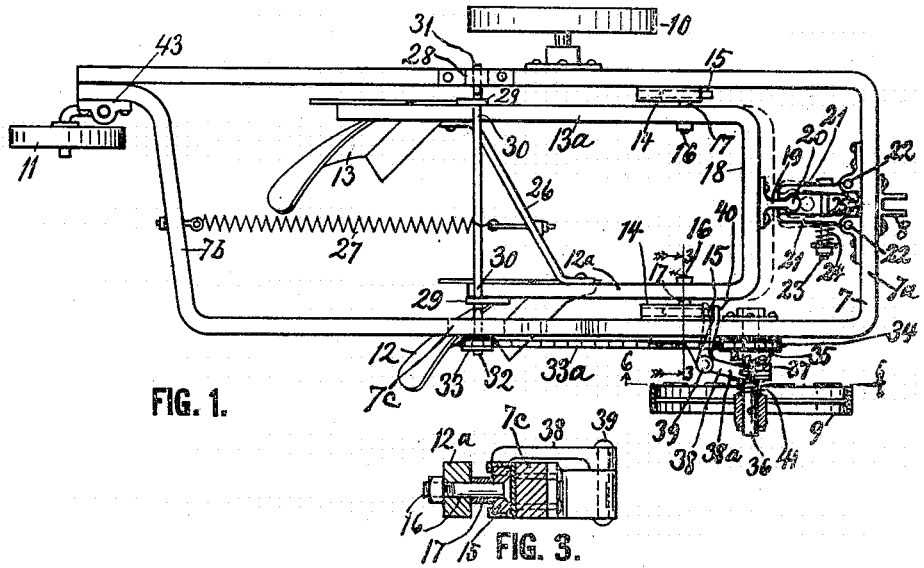
FIG. 1.
FIG. 3.
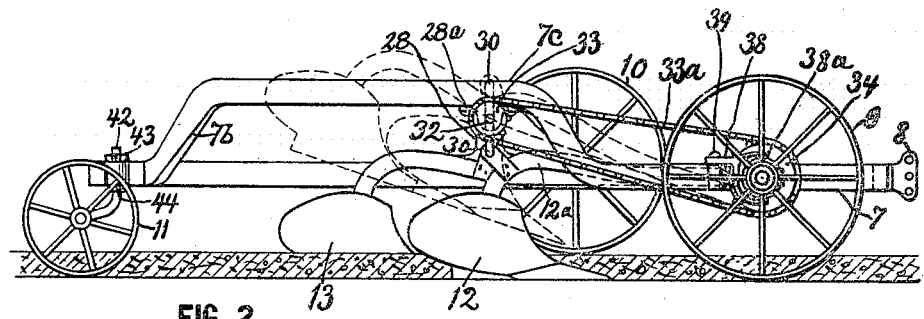
FIG. 2.
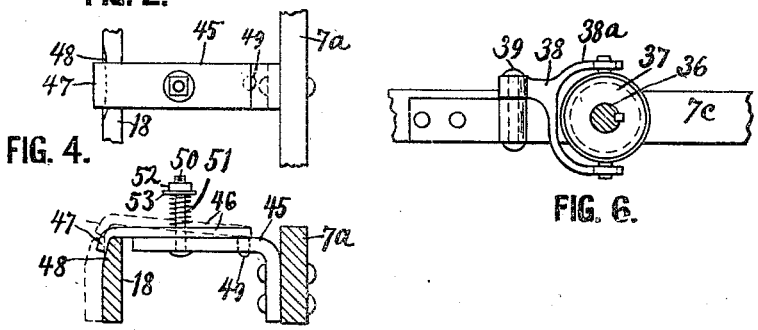
FIG. 4.
FIG. 5.
FIG. 6.
INVENTOR:
Benjamin C. F. Pritzel,
BY HIS ATTORNEY
A. M. Carlsen.

UNITED STATES PATENT OFFICE.

BENJAMIN C. F. PRITZEL, OF STILLWATER, MINNESOTA.

PLOW-RELEASING DEVICE.

1,373,971. Specification of Letters Patent. Patented Apr. 5, 1921.

Application filed December 4, 1920. Serial No. 428,355.

*To all whom it may concern:*

Be it known that I, BENJAMIN C. F. PRITZEL, a citizen of the United States, residing at Stillwater, in the county of Washington and State of Minnesota, have invented a new and useful Plow-Releasing Device, of which the following is a specification.

My invention relates to plows of the kind so constructed that when they meet a rock or other obstruction in the ground they will automatically release themselves from the obstruction and pass over it and resume the plowing process, and the object of the invention is to make certain improvements in said kind of plows.

In the accompanying drawing, Figure 1 is a top or plan view of the improved plow showing the invention embodied in a small gang plow comprising only two plows.

Fig. 2 is a side elevation of Fig. 1.

Fig. 3 is a section on line 3—3 in Fig. 1 on an enlarged scale.

Fig. 4 is mainly a top view of the automatic coupling of the plow in a modified form.

Fig. 5 is a side view of Fig. 4.

Fig. 6 is an enlarged section on the line 6—6 in Fig. 1.

Referring to the drawing by reference numerals, 7 designates the frame, 8 the draft clevis, 9, 10 and 11 the supporting wheels of an ordinary gang plow of the kind comprising several plows but most often only two plows are used and arranged about as 12 and 13 in the drawing.

My invention is applicable also to a single plow.

At opposite points the inner sides of the frame 7 is provided with longitudinal guides 14 for slides 15, in which are supported trunnions 16 fixed in the plow beams 12$^a$, 13$^a$. 17 are spacing collars to hold the plows against lateral movement, each trunnion being preferably made of a bolt with countersunk head as shown in Fig. 3. The front ends of the plow beams are rigidly secured together by a cross bar 18, the middle of which carries a coupling member 19 having a head 20 adapted to be held between two curved jaws 21 which are pivoted at 22 to the front bar 7$^a$ of the frame 7. A bolt 23 and spring 24 hold the jaws closed in normal position with projections 25 of the jaws stopping against the bar 7$^a$.

The plow beams are also united by a diagonal bar 26, which is connected by a spring 27 to the rear bar 7$^b$, of the frame 7, as shown in Fig. 1. Each plow beam is also provided with a bearing 29, in which engages the middle portion 30 of a crank, the offset end portions 31, 32 of which are journaled one in a bearing 28$^a$ on the upwardly offset portion 7$^c$ of the right hand side bar of the frame 7, and the other in a bracket 28 fixed upon the left hand side of the frame.

Fixed on the end portion 32 of the crank shaft thus formed, is a sprocket wheel 33 having an endless link belt 33$^a$ engaged by a sprocket 34 which carries a clutch member 35 and is rotatable on a short shaft 36 journaled in the frame 7 and fixed in the ground wheel 9 so as to be rotated by it. Slidably keyed on said shaft is another clutch member 37 which is movable into and out of action by the fork 38$^a$ and bell-crank lever 38 (see Fig. 6), which lever is fulcrumed to the frame at 39 and has its arm 40 normally supported by the front end of the adjacent slide 15, against which it is pressed, by a spring 41 partly compressed between the clutch member 37 and the hub of the wheel 9. The stem 42 of the rear wheel 11 may have two collars 43, 44 with set-screws for regulating the height of the rear end of the frame from the ground.

In the operation of the plow, the frame 7 may be drawn by either draft animals or by a tractor. In either case, if one or both plows meet a rock or other obstruction in the ground, the unusual resistance or strain created thereby causes the spring 24 to yield and let the coupling member 20 escape rearwardly, the plow or plows thus uncoupled are instantly pulled rearwardly by the spring 27, which causes the plows to disengage and move rearwardly and upwardly from the obstruction, the crank 30 turning from its downward position to about horizontal position. At the same time this movement has retracted the slide 15 rearwardly from the arm 40 of the clutch lever or shifter, whereby the spring 41 has been at liberty to throw the clutch member 37 into mesh with member 35 so that the latter will instantly act on link belt 33$^a$ and cause crank 30 to turn farther and raise the plows above the ground and move them forward and then downward until the coupling head 20 moves forward, below, and then upward between the jaws 21 while the plows sink again into the soil and continue their work. The moment this is accomplished the slide 15 has been moved forward with the plows and has so swung the arm 40 forward that the spring 41 becomes compressed and the clutch members 35, 37 are separated.

In the modification shown in Figs. 4 and 5, the coupling is simplified to a single flat arm 45 fixed on the frame bar 7ª, and a flat coupling member or bar 46 having an inclined hook 47 adapted to engage an incline 48 on the bar 18 uniting the plow beams. The member 46 has a tooth 49 depending into a hole in the arm 45, and a bolt 50 is passed loosely through the arm 45 and member 46 and encircled by a partly compressed spring 51 interposed between the member 46 and a nut 52 of the bolt, or a washer 53 adjacent thereto. With this form of coupling, when the plow or plows are obstructed, the spring 51 yields and lets the coupling member 46 rise till the bar 18 escapes rearwardly, the rest of the operation is the same as already described, for the main form of coupling shown in Fig. 1, the bar 18 moving downward, forward and then upward and is then pulled rearward against hook 47 when the plow is returned to normal position after passing over an obstruction.

It will be understood that I do not mean to confine the coupling to a movement of the head 20 only upwardly to get in between the jaws 21 since it is also practical to let the head push the jaws apart by pressing forward in between them.

What I claim is:—

1. The combination with a skeleton frame having supporting wheels on which it is to be drawn forward, of a plowing device within the frame and having its front end coupled to the front end of the frame by a spring-pressed device adapted to yield and uncouple the plowing device when the latter gets obstructed, a crank-shaft journaled across the frame and having its crank engaged with the plowing device, said plowing device having its front portion provided with trunnions journaled in longitudinally slidable plates guided to slide one upon each side bar of the wheeled frame, a short shaft journaled in one side of the frame and forming the axle of one of the ground wheels fixed on it, a clutch member rotatable on the short shaft and having attached to it a sprocket, another sprocket fixed on the crank-shaft and a link belt connecting the two sprockets, a second clutch member slidably keyed on the short shaft and a spring tending at all times to engage said second clutch member with the first mentioned clutch member, a pivotally mounted shifter engaging the second clutch member and having an arm supported by one of the sliding plates holding the trunnions, as long as said plate is in its normal forward position.

2. The structure specified in claim 1, and a spring tending at all times to pull the plowing device rearwardly in the frame.

3. The structure specified in claim 1, and means for varying the tension of the spring that acts on the coupling to resist its uncoupling.

4. The combination with a wheel-supported open frame, of a pair of spring-closed coupling jaws in the front end thereof, a plowing device slidably and tiltably mounted in the frame and having a headed coupling member adapted to be held between said jaws, means for limiting the closing of the jaws and for holding them normally in position to receive the headed member, a mechanism with clutch connection between one of the supporting wheels and the plowing device to move the latter forward into coupled position and means actuated by the forward movement of the plowing device for rendering the clutch device neutral when the coupling members are engaged.

5. The structure specified in claim 4, said plowing device having also a tilting movement, and means in the said mechanism for tilting the plowing device so as to raise it over the obstructions in the ground.

6. The structure specified in claim 1, said shaft having its crank turned downward to hold the plowing device firmly in lowered position in the ground whenever the coupling members are properly engaged for action.

In testimony whereof I affix my signature.

BENJAMIN C. F. PRITZEL.